United States Patent
Jiang et al.

(10) Patent No.: US 8,899,851 B2
(45) Date of Patent: Dec. 2, 2014

(54) CARBON NANOTUBE BASED KEYBOARD

(75) Inventors: Kai-Li Jiang, Beijing (CN); Shou-Shan Fan, Beijing (CN); Jia-Shyong Cheng, New Taipei (TW); Liang Liu, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 312 days.

(21) Appl. No.: 13/196,021

(22) Filed: Aug. 2, 2011

(65) Prior Publication Data

US 2012/0193203 A1 Aug. 2, 2012

(30) Foreign Application Priority Data

Jan. 28, 2011 (CN) .......................... 2011 1 0031060

(51) Int. Cl.
*G06F 3/02* (2006.01)
*G06F 3/041* (2006.01)

(52) U.S. Cl.
CPC ................................ *G06F 3/0202* (2013.01)
USPC ........... 400/479; 400/472; 400/477; 345/173; 345/174

(58) Field of Classification Search
USPC ............................. 400/472, 477, 479.2, 479
See application file for complete search history.

(56) References Cited

U.S. PATENT DOCUMENTS

| | | | | |
|---|---|---|---|---|
| 7,352,355 B2* | 4/2008 | Troxell et al. | | 345/156 |
| 8,120,595 B2* | 2/2012 | Kukulj et al. | | 345/176 |
| 2002/0025837 A1* | 2/2002 | Levy | | 455/566 |
| 2002/0049070 A1 | 4/2002 | Bick | | |
| 2002/0135457 A1* | 9/2002 | Sandbach et al. | | 338/47 |
| 2008/0248235 A1 | 10/2008 | Feng et al. | | |
| 2008/0299031 A1 | 12/2008 | Liu et al. | | |
| 2009/0109068 A1 | 4/2009 | Yeh et al. | | |
| 2009/0160798 A1 | 6/2009 | Jiang et al. | | |
| 2009/0167709 A1 | 7/2009 | Jiang et al. | | |
| 2009/0167711 A1 | 7/2009 | Jiang et al. | | |
| 2010/0127989 A1* | 5/2010 | Oba et al. | | 345/168 |
| 2010/0214231 A1 | 8/2010 | D'Souza et al. | | |
| 2010/0220074 A1* | 9/2010 | Irvin et al. | | 345/174 |
| 2010/0317409 A1* | 12/2010 | Jiang et al. | | 455/566 |
| 2011/0007026 A1* | 1/2011 | Chen et al. | | 345/174 |
| 2011/0299015 A1* | 12/2011 | Liu et al. | | 349/96 |
| 2012/0068934 A1* | 3/2012 | Larsen | | 345/168 |

FOREIGN PATENT DOCUMENTS

| | | |
|---|---|---|
| CN | 101239712 | 8/2008 |
| CN | 101424989 | 5/2009 |
| CN | 101452351 | 6/2009 |
| CN | 101464765 | 6/2009 |
| CN | 101852935 | 10/2010 |

(Continued)

*Primary Examiner* — Daniel J Colilla
(74) *Attorney, Agent, or Firm* — Novak Druce Connolly Bove + Quigg LLP

(57) ABSTRACT

A keyboard includes a first substrate, a second substrate, a first electrode layer and a second electrode layer. The first substrate includes a first upper surface and a first lower surface. The second substrate is located apart from the first substrate and includes a second upper surface and a second lower surface. The second upper surface faces the first lower surface. The first electrode layer is located on the first lower surface and includes a first conductive layer including a carbon nanotube layer structure. The second electrode layer is located on the second upper surface and includes a second conductive layer. A number of keys is located on the first upper surface or the second lower surface.

11 Claims, 10 Drawing Sheets

(56) References Cited

FOREIGN PATENT DOCUMENTS

| | | | | |
|---|---|---|---|---|
| CN | 101901069 | 12/2010 | | |
| JP | 2009140482 A | * 6/2009 | ............ | G06F 3/045 |
| TW | 200928908 | 7/2009 | | |
| TW | 200928913 | 7/2009 | | |
| TW | 200928914 | 7/2009 | | |
| TW | 201035845 | 10/2010 | | |
| TW | 200900348 | 12/2010 | | |
| TW | 201101780 | 1/2011 | | |
| TW | 201102887 | 1/2011 | | |

* cited by examiner

CARBON NANOTUBE BASED KEYBOARD

RELATED APPLICATIONS

This application claims all benefits accruing under 35 U.S.C. §119 from China Patent Application No. 201110031060.6, filed on Jan. 28, 2011, in the China Intellectual Property Office, the disclosure of which is incorporated herein by reference.

BACKGROUND

1. Technical Field

The disclosure relates to keyboards, particularly to a carbon nanotube-based keyboard.

2. Description of Related Art

Conventional keyboards are made of hard plastics and are rigid in structure. Furthermore, the conventional keyboards are relatively large in size when paired with small electronic devices, which then becomes a bulky accessory with limited portability.

What is needed, therefore, is a keyboard that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
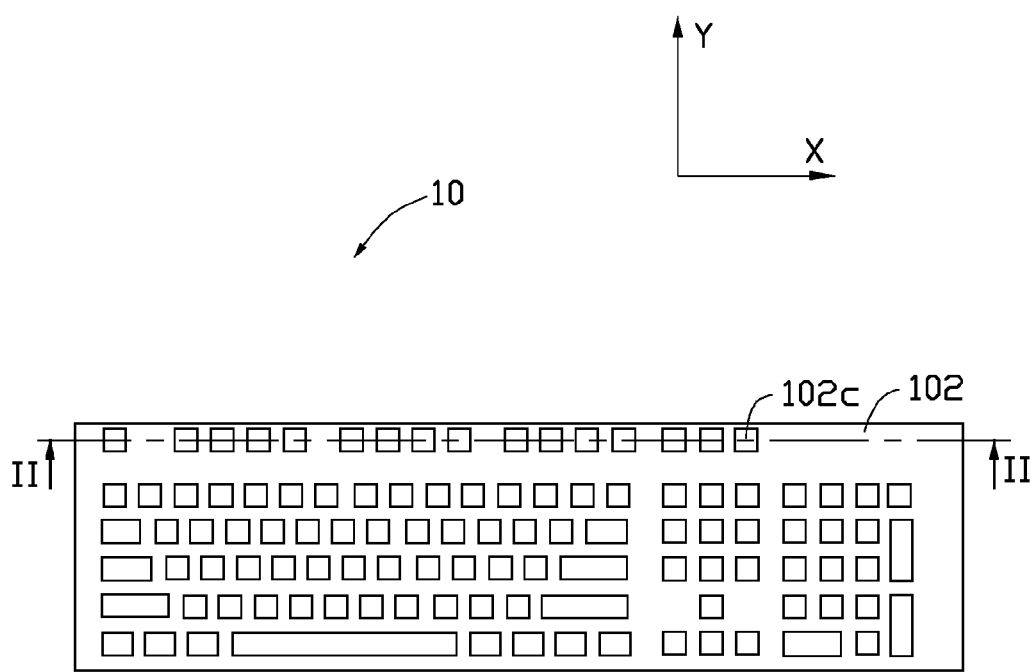
FIG. 1 is a schematic top view of an embodiment of a keyboard.
Figure 2:
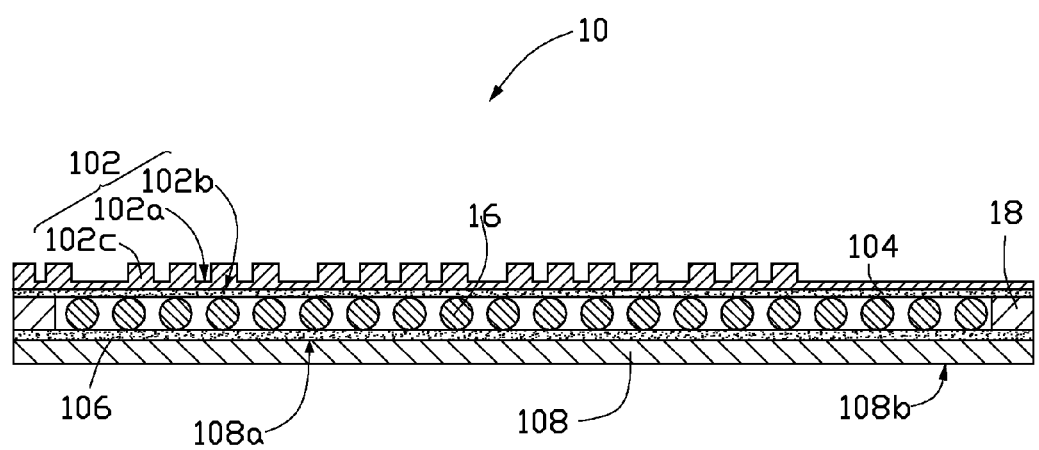
FIG. 2 is a schematic cross-sectional view along line II-II of the keyboard in FIG. 1.

Referring to FIG. 1 and FIG. 2, one embodiment of a keyboard 10 comprises a first substrate 102, a first electrode layer 104, a second electrode layer 106, a plurality of dot spacers 16, and a second substrate 108. The first substrate 102 and the second substrate 108 are located apart from each other. The first substrate 102 includes a first upper surface 102a and a first lower surface 102b opposite the first upper surface 102a. The first upper surface 102a is an operating surface for users. The second substrate 108 includes a second upper surface 108a and a second lower surface 108b. The second upper surface 108a faces the first lower surface 102b. The plurality of spacers 16 is located between the first lower surface 102b and the second upper surface 108a. The first electrode layer 104 is located on the first lower surface 102b. The first electrode layer 104 can be fixed on the first lower surface 102b via adhesive or mechanical method. The second electrode layer 106 is located on the second upper surface 108a. The second electrode layer 106 can be fixed on the first lower surface 102b via adhesive or mechanical method. The first electrode layer 104 faces the second electrode layer 106. The location of the first electrode layer 104 and the second electrode layer 106 can be interchanged. That is to say, the first electrode layer 104 can be located on the second upper surface 108a and the second electrode layer 106 can be located on the first lower surface 102b.

The material of the first substrate 102 is flexible and insulative, and can be for example, resin, rubber, plastics or combination thereof. Specifically, the material of the first substrate can be polycarbonate (PC), polymethyl methacrylate acrylic (PMMA), polyethylene terephthalate (PET), polyethersulfones (PES), polyvinylchloride (PVC), benzocyclobutenes (BCB), polyesters, or acrylic resins. A number of keys 102c are located on the first upper surface 102a of the first substrate 102. Each key 102c can have a different mark from the other keys 102c, such as letters. The keys 102c are arranged in a plurality of rows, and each row includes at least one key 102c. Each row is oriented in an X direction as shown in FIG. 1. Each row can include a plurality of keys 102c, and the keys 102c in the same row can have the same width. The length of the keys 102c in the same row can be different from each other. Each of the keys 102c can have a rectangular shape having a width and a length in the X direction, or any other shape as desired. In one embodiment, the keys 102c are a plurality of protrusions integrated with the first substrate 102 on the first upper surface 102a. In one embodiment according to FIGS. 1 and 2, the first substrate 102 is made of a rubber material, and six lines of keys 102c are formed on the first upper surface 102a having marks on the keys 102c similar to a conventional keyboard.

The material of the second substrate 108 can be the same as the first substrate 102. In one embodiment, the material of the second substrate 108 is a fabric material.

Figure 3:
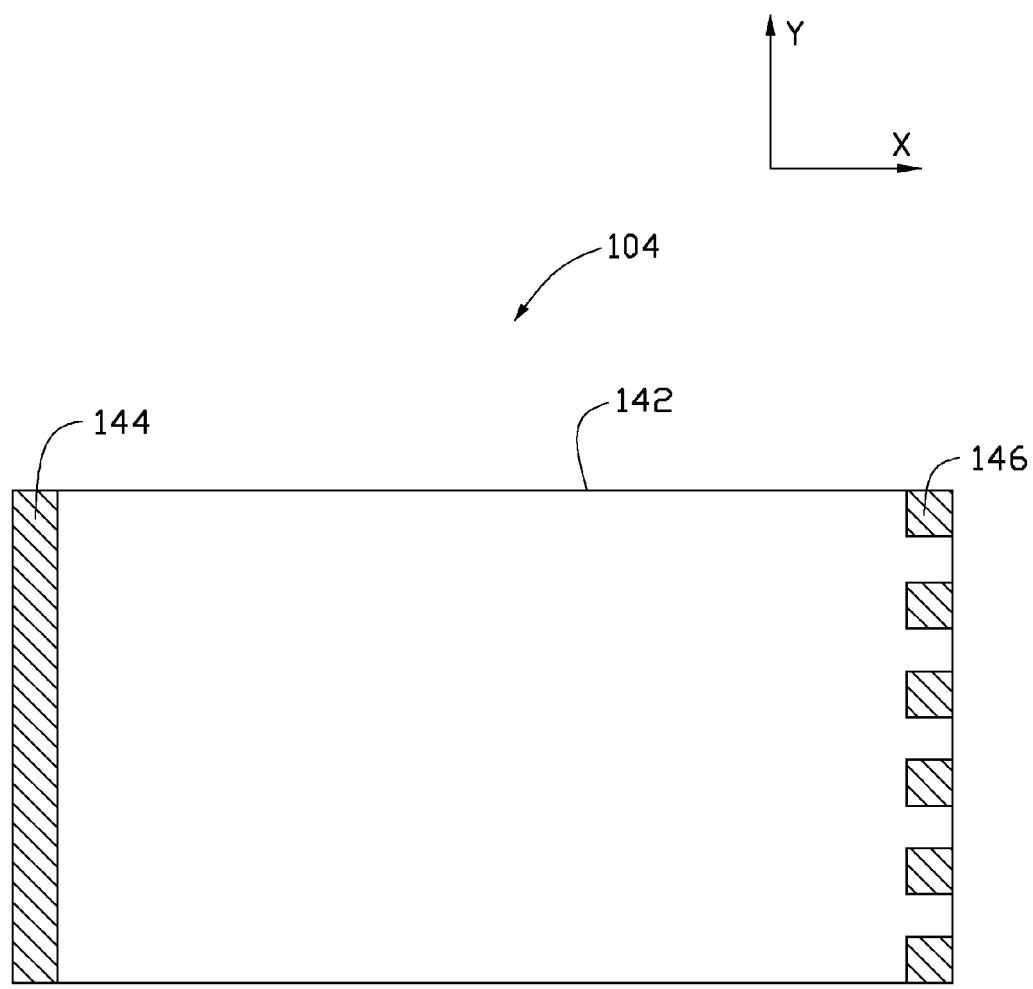
FIG. 3 is a schematic view of a first electrode layer used in the keyboard of FIG. 1.

Referring also to FIG. 3, the first electrode layer 104 includes a first conductive layer 142, a first electrode 144, and a plurality of detecting electrodes 146. The first electrode 144 and the detecting electrodes 146 are electrically connected to the first conductive layer 142. The first electrode 144 is located at one end of the first conductive layer 142, and the detecting electrodes 146 are located at another end of the second conductive layer 142. The first electrode 144 is shown oriented along a first direction Y and the detecting electrodes 146 are arranged along the first direction Y as shown in FIG. 3. The distance between adjacent detecting electrodes 146 can be uniform. A second direction X is perpendicular to the first direction Y is shown in FIG. 3.

Figure 4:
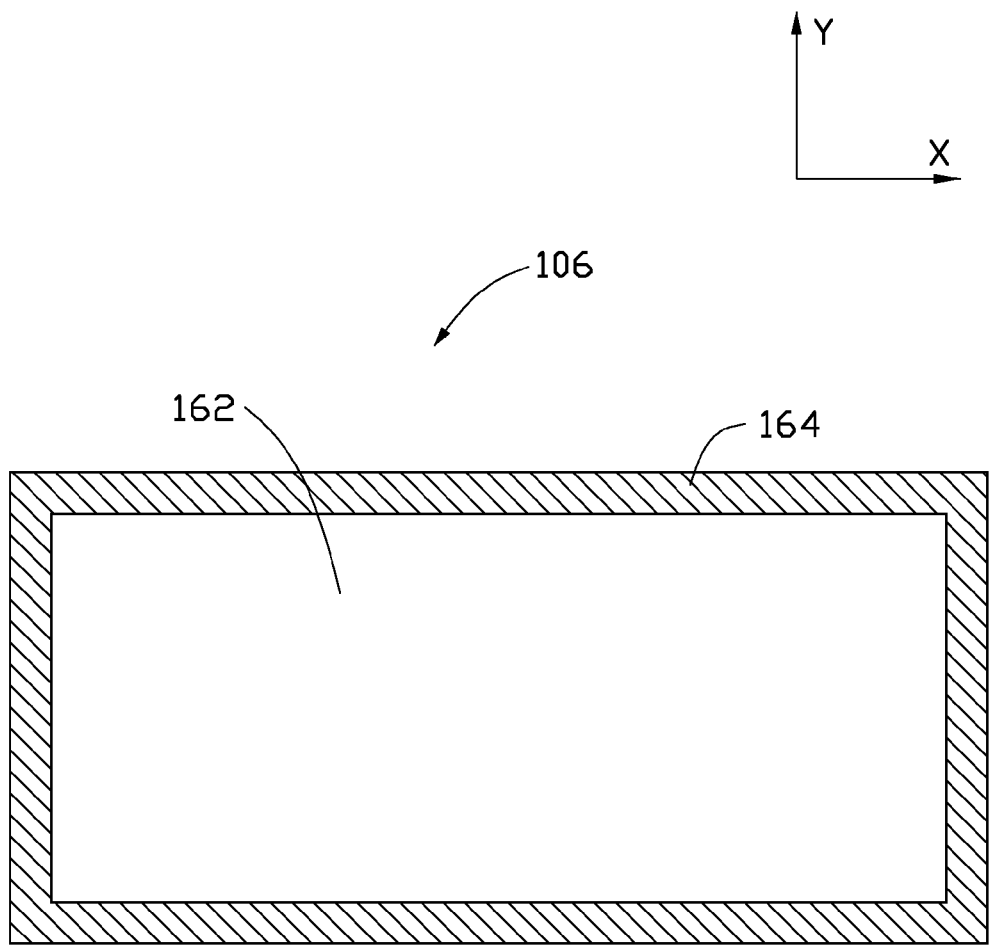
FIG. 4 is a schematic view of a second electrode layer used in the keyboard of FIG. 1.

Referring to FIG. 4, the second electrode layer 106 includes a second conductive layer 162 and a second electrode 164. The second electrode 164 is electrically connected with the second conductive layer 162. The second electrode 164 surrounds and contacts the second conductive layer 162. In one embodiment illustrated in FIG. 4, the second electrode 164 is located on a surface of the second conductive layer 162 and symmetrically aligned with four sides of the second conductive layer 162.

Referring to FIG. 2, an insulative layer 18 can be provided between the first and second substrates 102, 108 and surrounds the first electrode layer 104 or the second electrode layer 106. In one embodiment, the insulative layer 18 is in the form of a rectangular frame. The first electrode layer 104 faces, but is spaced from, the second electrode layer 106. The dot spacers 16 are located within the second conductive layer 142. The distance between the second electrode layer 106 and the first electrode layer 104 can be in a range from about 1 centimeter (cm) to about 2 cm. The insulative layer 18 and the dot spacers 16 are made of, for example, insulative resin or other suitable insulative materials. Electrical insulation between the first electrode layer 104 and the second electrode layer 106 is provided by the insulative layer 18 and the dot spacers 16. It is to be understood that the dot spacers 16 are optional, particularly if the size of the keyboard 10 is relatively small.

The first electrode 144, the second electrode 164 and the plurality of detecting electrodes 146 are made of conductive material, such as metal, alloy, or indium tin oxide (ITO). The shapes of the first electrode 144 and the second electrode 164 can be linear, such as wire-shaped or bar-shaped. The shape of each detecting electrode 146 can be block shaped. The cross sectional shape of the first electrode 144 and the second electrode 164 can be round, polygonal such as a square, trapezium, or triangle, or any other desired shape. The thickness of the first electrode 144, the second electrode 164 and the detecting electrode 146 can be any size, depending on the design. In one embodiment, the first electrode 144 and the second electrode 164 are both silver wires made by a screen print method, and the detecting electrodes 146 are silver spots made by a screen print method.

The first conductive layer 142 can be a conductive film having different resistances along different directions, e.g., the resistivity of the first conductive layer 142 is different in a two-dimensional space. For example, referring to FIG. 3, the resistivity of the first conductive layer 142 along the first direction Y is larger than the resistivity of the first conductive layer 142 along the second direction X. A plurality of conductive passages is defined between detecting electrodes 146 and the first electrode 144. One conductive passage corresponds to one detecting electrode 146. There are more conductive passages than the number of rows of keys 102c, to ensure that the location of each key 102c can be detected. In one embodiment, one passage corresponds to one row of keys 102c. The number of conductive passages is equal to the number of detecting electrodes 146 and the number of detecting electrodes 146 is greater than the number of rows of the keys 102c. A distance between adjacent detecting electrodes 146 is equal to or larger than the distance between the adjacent rows of keys 102c. In one embodiment according to FIG. 3, the number of the detecting electrodes 146 is six, and six conductive passages are formed. The first electrode 144 is an input electrode, and the detecting electrodes 146 are output electrodes.

The first conductive layer 142 can be a first carbon nanotube layer structure including a plurality of carbon nanotubes. The first carbon nanotube layer structure can be a freestanding structure, that is, the first carbon nanotube layer structure can support itself without a substrate. For example, if at least one point of the first carbon nanotube layer structure is held, the entire first carbon nanotube layer structure can be lifted without being damaged. The plurality of carbon nanotubes in the first carbon nanotube structure is substantially oriented along a same direction. In one embodiment, the first carbon nanotube layer structure is a pure structure of carbon nanotubes. The first carbon nanotube layer structure can include at least one drawn carbon nanotube film. In one embodiment, the first carbon nanotube layer structure can include at least two stacked drawn carbon nanotube films or a plurality of drawn carbon nanotube films contiguously positioned side by side, with the carbon nanotubes in the drawn carbon nanotube films substantially oriented along the same direction.

Figure 5:
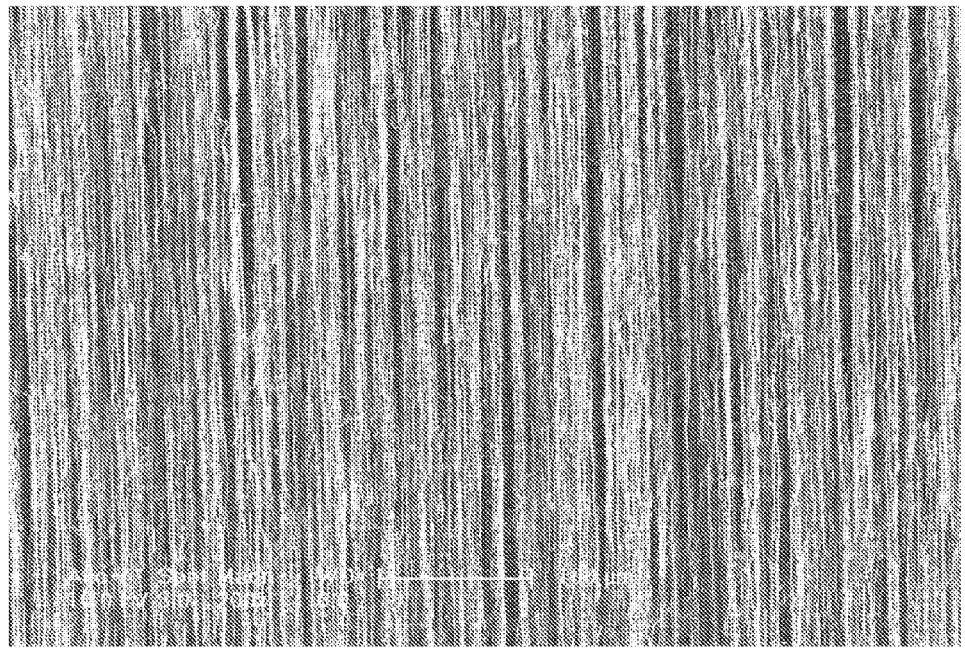
FIG. 5 shows a Scanning Electron Microscope image of a drawn carbon nanotube film.

Referring to FIG. 5, the drawn carbon nanotube film includes a number of successive and oriented carbon nanotubes joined end-to-end by van der Waals attractive force therebetween. The drawn carbon nanotube film is a freestanding film. Each drawn carbon nanotube film includes a number of successively oriented carbon nanotube segments joined end-to-end by van der Waals attractive force therebetween. Each carbon nanotube segment includes a number of carbon nanotubes substantially parallel to each other, and joined by van der Waals attractive force therebetween. Some variations can occur in the carbon nanotube film. The carbon nanotubes in the drawn carbon nanotube film are oriented along a preferred orientation. The drawn carbon nanotube film can be treated with an organic solvent to increase the mechanical strength and toughness of the drawn carbon nanotube film and reduce the coefficient of friction of the drawn carbon nanotube film. The thickness of the carbon nanotube film can range from about 0.5 nm to about 100 μm.

The carbon nanotubes in the drawn carbon nanotube structure can be single-walled, double-walled, and/or multi-walled carbon nanotubes. The diameters of the single-walled carbon nanotubes can range from about 0.5 nm to about 50 nm. The diameters of the double-walled carbon nanotubes can range from about 1 nm to about 50 nm. The diameters of the multi-walled carbon nanotubes can range from about 1.5 nm to about 50 nm. The lengths of the carbon nanotubes can range from about 200 μm to about 900 μm.

In one embodiment according to FIG. 3, the first conductive layer 142 includes one layer of drawn carbon nanotube film. The carbon nanotubes in the carbon nanotube film are substantially oriented along the second direction X.

The second conductive layer 162 comprises a second carbon nanotube layer structure. The second carbon nanotube layer structure includes a plurality of carbon nanotubes joined by van der Waals attractive force therebetween. The second carbon nanotube layer structure can be a substantially pure structure of carbon nanotubes with few impurities. The second carbon nanotube layer structure can be a freestanding structure, that is, the second carbon nanotube layer structure can be supported by itself without a substrate.

The carbon nanotubes in the second carbon nanotube layer structure can be orderly or disorderly arranged. The term 'disordered carbon nanotube layer structure' refers to a structure where the carbon nanotubes are arranged along different directions, and the aligning directions of the carbon nanotubes are random. The number of the carbon nanotubes arranged along each different direction can be almost the same (e.g. uniformly disordered). The disordered carbon nanotube layer structure can be isotropic, namely the carbon nanotube layer structure has identical properties in all directions of the carbon nanotube layer structure. The carbon nanotubes in the disordered carbon nanotube layer structure can be entangled with each other.

The second carbon nanotube layer structure including ordered carbon nanotubes is an ordered carbon nanotube layer structure. The term 'ordered carbon nanotube layer structure' refers to a structure where the carbon nanotubes are arranged in a consistent and systematic manner, e.g., the carbon nanotubes are arranged approximately along a same direction and/or have two or more sections, each of which the carbon nanotubes are arranged approximately along a same direction (different sections can have different directions). The carbon nanotubes in the second carbon nanotube layer structure can be selected from single-walled, double-walled, and/or multi-walled carbon nanotubes. The second carbon nanotube layer structure includes at least one carbon nanotube film.

In one embodiment, the carbon nanotube film is the drawn carbon nanotube film as disclosed above. The second carbon nanotube layer structure can include at least two stacked carbon nanotube films. The carbon nanotubes in the drawn carbon nanotube film are aligned along one preferred orientation. An angle can exist between the orientations of the carbon nanotubes in stacked or adjacent drawn carbon nanotube films. An angle between the aligned directions of the carbon nanotubes in two adjacent drawn carbon nanotube films can range from about 0 degrees to about 90 degrees, such as the angle can be about 15 degrees, 45 degrees or 60 degrees.

In other embodiments, the carbon nanotube film can be a flocculated carbon nanotube film. The flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. Because the carbon nanotubes in the carbon nanotube layer structure are entangled with each other, the second carbon nanotube layer structure employing the flocculated carbon nanotube film has excellent durability, and can be fashioned into desired shapes with a low risk in harming the integrity of the carbon nanotube layer structure. The thickness of the flocculated carbon nanotube film can range from about 0.5 nm to about 1 mm.

In other embodiments, the carbon nanotube film can be a pressed carbon nanotube film. The carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. If the carbon nanotubes in the pressed carbon nanotube film are arranged along different directions, the carbon nanotube layer structure can be isotropic. Here, "isotropic" means the carbon nanotube film has properties identical in all directions substantially parallel to a surface of the carbon nanotube film. The thickness of the pressed carbon nanotube film ranges from about 0.5 nm to about 1 mm.

In one embodiment according to FIG. 4, the second carbon nanotube layer structure 162 is a flocculated carbon nanotube film.

The keyboard 10 can be connected to an electronic device via USB port or Bluetooth system. The first electrode 144 and the second electrode 164 are the input electrodes configured to input voltage signals, and the detecting electrodes 146 are the output electrodes configured to output voltage signals. When one of the keys 102c is pressed down, the first conductive layer 142 contacts the second conductive layer 162, and the location of the pressed key 120c can be detected by measuring the voltage of each detecting electrode 146. If a plurality of keys 102c is pressed, the detecting electrodes 146 can be used to detect the location of each touching point. The location of one touching point at the first direction Y can be detected by the corresponding detecting electrode 146. The location of the touching point at the second direction X can be detected by the voltage change of the detecting electrode 146, because a change of the voltage of the detecting electrodes 146 is related to a distance between the pressed key 102c and the detecting electrode 144. As such, the location of each pressed key 102c can be detected. Because the conductive passages between each detecting electrode 146 and the first electrode 144 do not affect each other, the locations of the many touching points can be detected at the same time.

The keyboard 10 illustrated in the present disclosure is a flexible keyboard, which increases the portability of the keyboard 10. When the keyboard 10 is connected with an electronic device, such as mobile phone, the keyboard 10 can wrap around the mobile phone to protect the mobile phone. If the second substrate 108 of the keyboard 10 is made of fabric, the second substrate 108 can also be used to clean the screen of the mobile phone.

Figure 6:
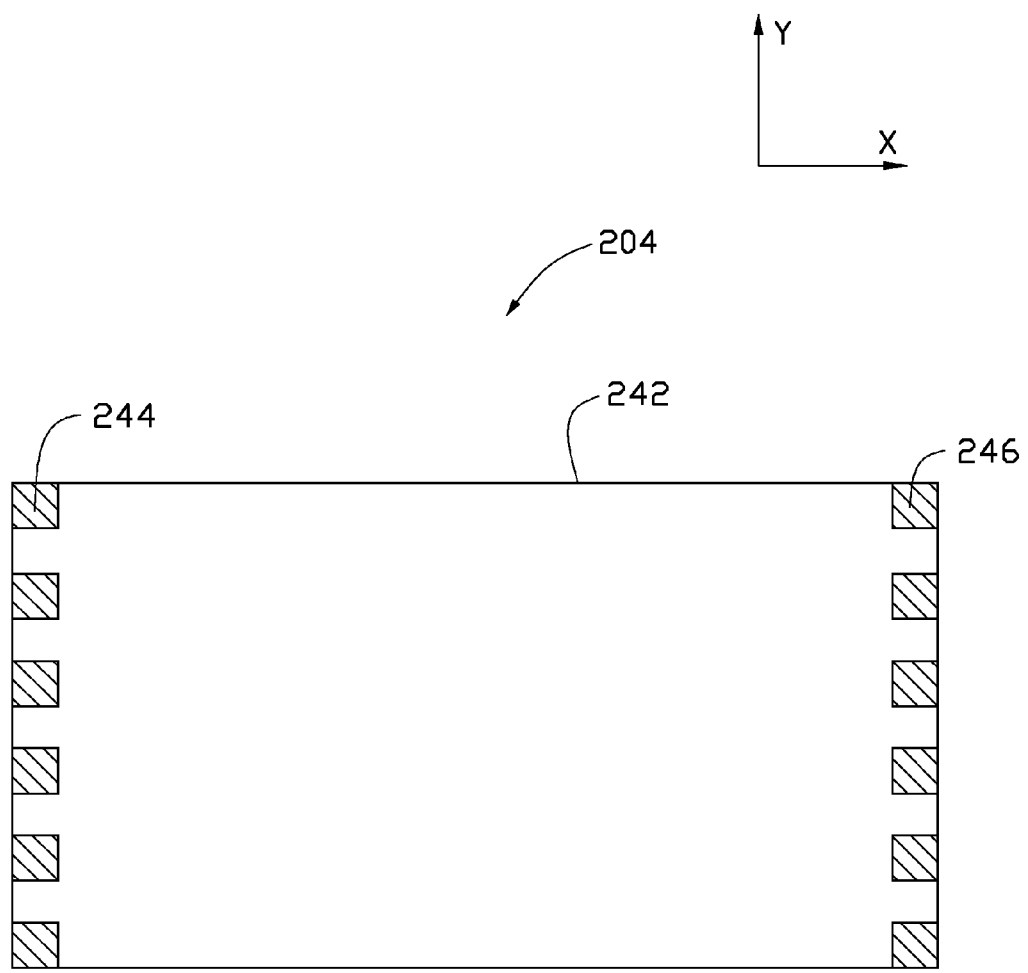
FIG. 6 is a schematic view of a first electrode layer used in a keyboard of another embodiment.

A keyboard according to another embodiment includes a first electrode layer 204 having the structures as shown in FIG. 6. The first electrode layer 204 includes a first conductive layer 242, a plurality of first detecting electrodes 244, and a plurality of second detecting electrodes 246. The first detecting electrodes 244 and the second detecting electrodes 246 are electrically connected to the first conductive layer 242. The first detecting electrodes 244 are located at one end of the first conductive layer 242, and the second detecting electrodes 246 are located at another end of the first conductive layer 242. The first detecting electrodes 244 are arranged along a first direction Y as shown in FIG. 6. The second detecting electrodes 246 are also arranged along the first direction Y. The first detecting electrodes 244 and the second detecting electrodes 246 are respectively aligned opposite to each other. The distance between adjacent first detecting electrodes 244 can be uniform and in a range from about 1 μm to about 1 cm. The distance between adjacent second detecting electrodes 246 can also be uniform and in a range from about 1 μm to about 1 cm. A second direction X is perpendicular to the first direction. A resistivity of the first conductive layer 242 along the first direction Y direction is larger than a resistivity along the second direction X.

In one embodiment, the first detecting electrodes 244 can be used as input electrodes and the second detecting electrodes 246 can be used as output electrodes. In another embodiment, the first detecting electrodes 244 can be used as output electrodes and the second detecting electrodes 246 used as input electrodes. Other characteristics of the keyboard are the same as the keyboard 10 disclosed above. The method of using the keyboard is the same as the method of using the keyboard 10 disclosed above.

Figure 7:
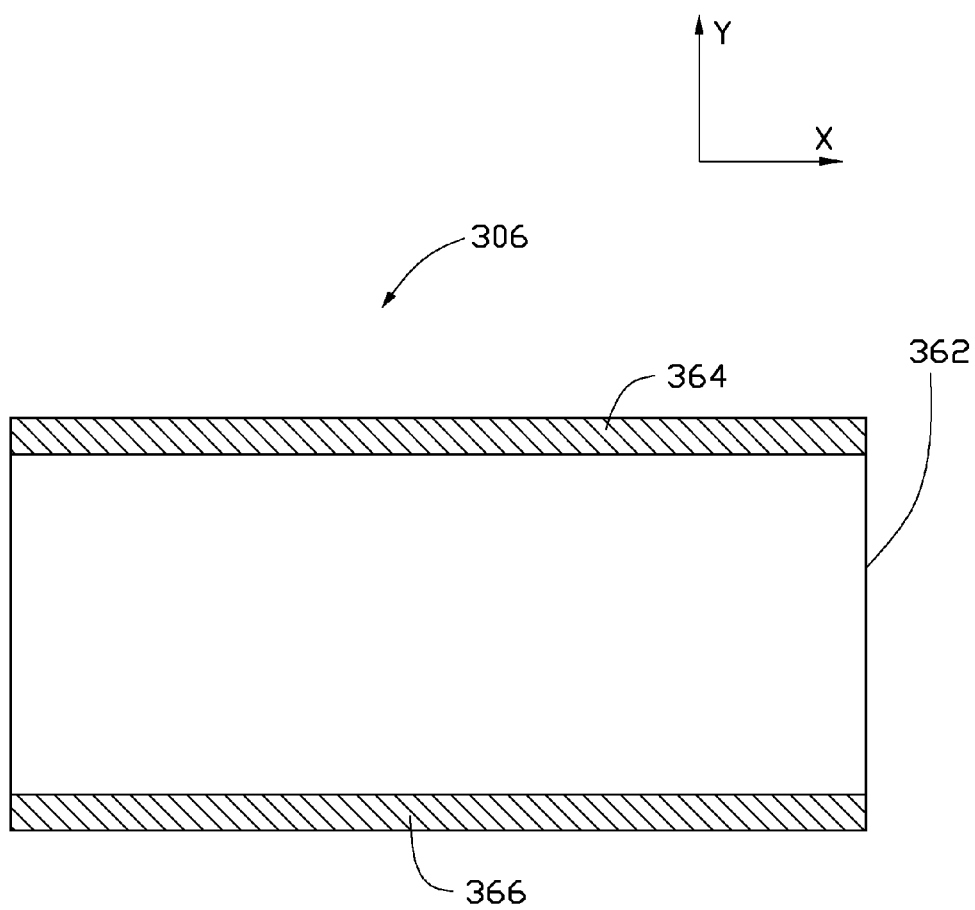
FIG. 7 is a schematic view of a second electrode layer used in a keyboard of another embodiment.

A keyboard according to another embodiment includes a second electrode layer 306 having the structures as shown in FIG. 7. The second electrode layer 306 includes a second conductive layer 362, a second electrode 364 and a third electrode 366. The second electrode 364 is oriented along the second direction X. The third electrode 366 is oriented along the second direction X. The second electrode 364 and the third electrode 366 both have a linear structure. The second conductive layer 362 can be a conductive film having different resistances along different directions. A resistivity of the second conductive layer 362 along the second direction X is larger than the resistivity along the first direction Y. The first conductive layer 362 can include the first carbon nanotube layer structure disclosed above. The carbon nanotubes in the first carbon nanotube layer structure are oriented along the first direction Y.

In use of the keyboard, the second electrode 364 or the third electrode 366 can be used as input electrode alternatively. The detecting principle of the keyboard is the same as the keyboard 10 disclosed above. Other characteristics of the keyboard are the same as the keyboard 10 disclosed above.

Figure 8:
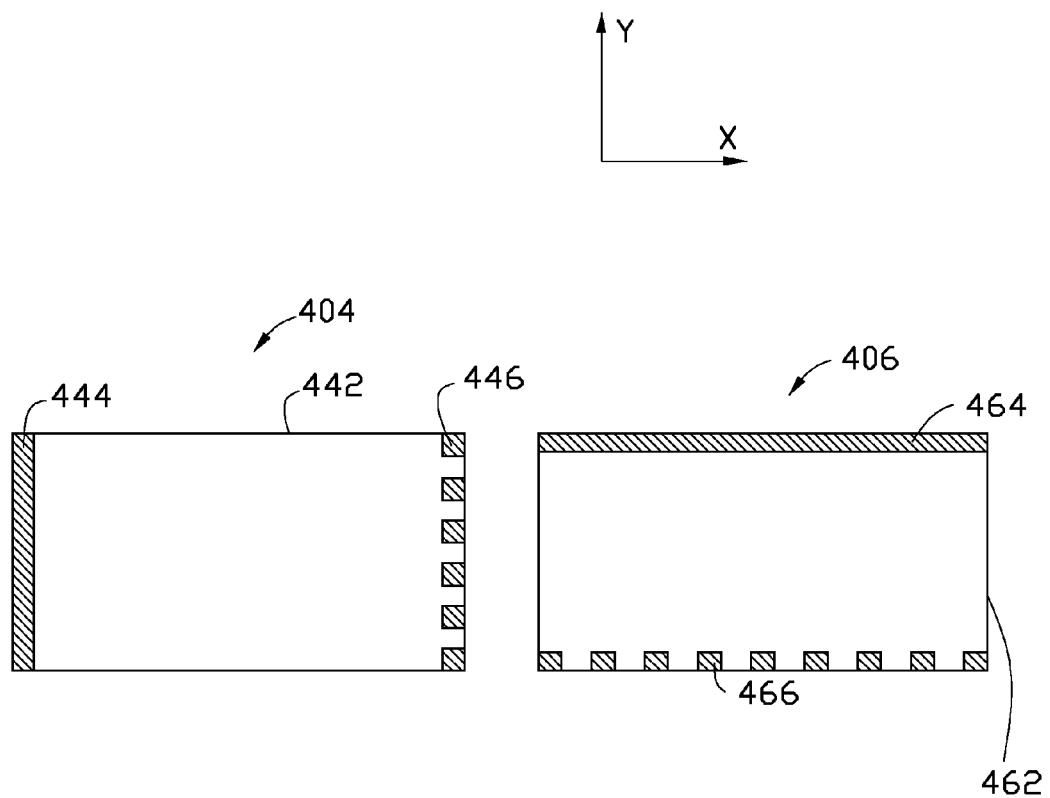
FIG. 8 is a schematic view of a first electrode layer and a second electrode layer used in a keyboard of one embodiment.

A keyboard according to another embodiment includes a first electrode layer 404 and a second electrode layer 406, the first electrode layer 404 and the second electrode layer 406 having the structures as shown in FIG. 8.

The first electrode layer 404 includes a first conductive layer 442, a first electrode 444, and a plurality of first detecting electrodes 446. The characteristics of the first electrode layer 404 are the same as the first electrode 104 disclosed above.

The second electrode layer 406 includes a second conductive layer 462, a second electrode 464, and a plurality of second detecting electrodes 466. The second electrode 464 is located at one end of and electrically connected with the second conductive layer 462. The plurality of second detecting electrodes 466 is located at another end of and electrically connected with the second conductive layer 462. The second electrode 464 is oriented along a second direction X. The second detecting electrodes 466 are arranged along the second direction X. A distance between adjacent second detecting electrodes 466 can be uniform and in a range from about 1 micrometer to about 1 centimeters. The second conductive layer 462 can be a conductive film having different resistances along different directions, e.g., the resistivity of the second conductive layer 462 in two-dimensional space is different. A resistivity of the second conductive layer 462 along the second direction X is larger than the resistivity along the first direction Y. The second conductive layer 462 can include a carbon nanotube layer structure. The carbon nanotube layer structure is the same as the first carbon nanotube layer structure as disclosed above. The carbon nanotubes in the carbon nanotube layer structure are oriented along the first direction Y. A conductive passage is formed between each second detecting electrode 466 and the second electrode 464, and a plurality of conductive passages is defined in the second electrode layer 406. The plurality of conductive passages on the second electrode layer 406 is substantially perpendicular to the conductive passages on the first electrode layer 404.

When using the keyboard, low voltage is inputted into the keyboard via the first electrode 444 or the first detecting electrodes 446, high voltage is inputted via the second electrode 464, and the location along the second direction X of a pressed key can be detected by the second detecting electrodes 466, because the pressed key corresponds with one conductive passage defined by one second detecting electrode. Low voltage is then inputted into the keyboard via the second electrode 464 or the second detecting electrodes 466, and high voltage is inputted via the first electrode 444, so that the location along the first direction Y of the pressed key can be detected by the first detecting electrodes 446. When a plurality of keys is pressed at the same time, the locations of the plurality of touching points can be detected at the same time because the conductive passages do not affect each other. Other characteristics of the keyboard are the same as the keyboard 10 disclosed above.

Figure 9:
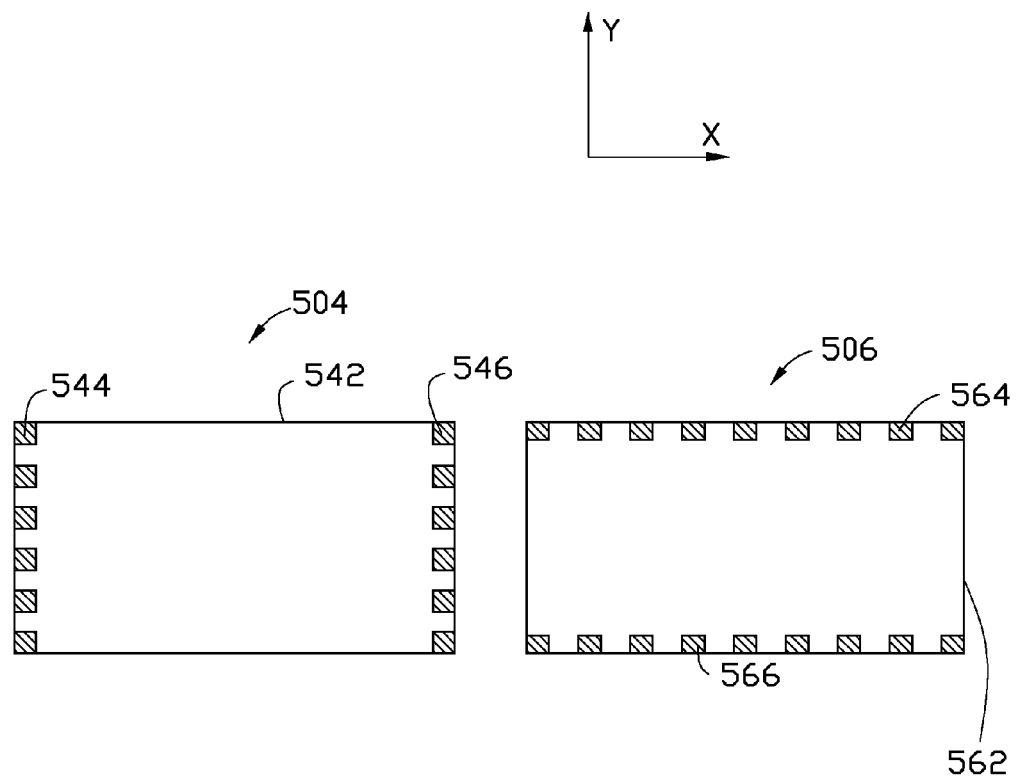
FIG. 9 is a schematic view of a first electrode layer and a second electrode layer used in a keyboard of an alternative embodiment.

A keyboard according to another embodiment includes a first electrode layer 504 and a second electrode layer 506. The first electrode layer 504 and the second electrode layer 506 has the structures as shown in FIG. 9.

The first electrode layer 504 includes a first conductive layer 542, a plurality of first electrode 544, and a plurality of first detecting electrodes 546. The characteristics of the first electrode layer 504 are the same as the first electrode 204 disclosed above.

The second electrode layer 506 includes a second conductive layer 562, a plurality of second electrodes 564 and a plurality of second detecting electrodes 566. The plurality of second electrodes 564 is located at one end of and electrically connected with the second conductive layer 562. The plurality of second detecting electrodes 566 is located at another end of and electrically connected with the second conductive layer 562. The plurality of second electrode 564 is oriented along a second direction X. A distance between adjacent second electrodes 564 can be uniform, and in a range from about 1 micrometer to about 1 centimeter. The second detecting electrodes 566 are arranged along the second direction X. A distance between adjacent second detecting electrodes 566 can be uniform, and in a range from about 1 micrometer to about 1 centimeter. The first conductive layer 562 can be a conductive film having different resistances along different directions, i.e., the resistivity of the first conductive layer 562 in two-dimensional space is different. A resistivity of the second conductive layer 562 along the second direction X is larger than the resistivity along the first direction Y. The first conductive layer 562 can include a carbon nanotube layer structure. The carbon nanotube layer structure is the same as the first carbon nanotube layer structure as disclosed above. The carbon nanotubes in the carbon nanotube layer structure are oriented along the first direction Y. A conductive passage is formed between each second detecting electrode 466 and each second electrode 464, therefore a plurality of conductive passages is formed on the second electrode layer 506. The plurality of conductive passages on the second electrode layer 506 is substantially perpendicular to the conductive passages on the first electrode layer 504.

In use of the keyboard, the first electrodes 544 and the first detecting electrodes can be used as output electrodes alternatively. The second electrodes 564 and the second detecting electrodes 566 can be used as output electrodes alternatively. In one embodiment, low voltage is input into the keyboard via the plurality of first electrodes 544 or the first detecting electrodes 546, high voltage is input via the second electrodes 564, and the second detecting electrodes 566 are used as output electrodes. The location along the second direction X of a pressed key can be detected by the second detecting electrodes 566. Low voltage is input into the keyboard via the second electrodes 564 or the second detecting electrodes 566, high voltage is input via the first electrodes 544, and the first detecting electrodes 546 are used as output electrodes. The location along the first direction Y of the pressed key can be detected by the first detecting electrodes 546. Other characteristics of the keyboard are the same as the keyboard 10 disclosed above.

Figure 10:
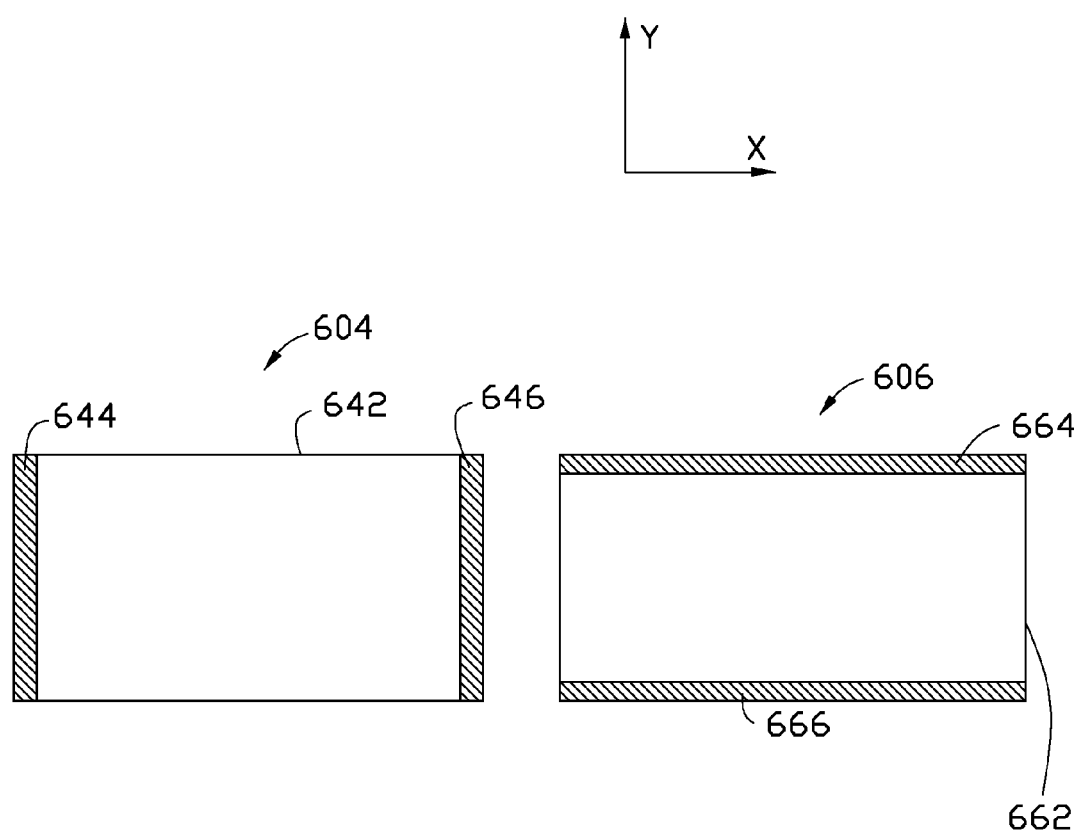
FIG. 10 is a schematic view of a first electrode layer and a second electrode layer used in a keyboard of another embodiment.

A keyboard according to another embodiment includes a first electrode layer 604 and a second electrode layer 606. The first electrode layer 604 and the second electrode layer 606 have the structures as shown in FIG. 10.

The first electrode layer 604 includes a first conductive layer 642, a first electrode 644, and a second electrode 646. The second electrode layer 606 includes a second conductive layer 662, a third electrode 664, and a fourth electrode 666.

The first electrode 644 and the second electrode 646 both have linear structures. The first electrode 644 is located at one end of and electrically connected with the first conductive layer 642. The second electrode 646 is located at another end of and electrically connected with the first conductive layer 642. The first electrode 644 and the second electrode 646 are oriented along a first direction Y.

The second electrode layer 606 has the same structures with the second electrode 306 disclosed above. The third electrode 664 and the fourth electrode 666 are oriented along a second direction X. The second direction is perpendicular with the first direction.

The first conductive layer 642 includes a carbon nanotube layer structure having the same structure with the second carbon nanotube layer structure disclosed above. The carbon nanotubes in the first conductive layer 642 are oriented along the second direction X. The carbon nanotubes in the second conductive layer 662 are oriented along the first direction Y.

In use of the keyboard, the first electrode 644 and the third electrode 664 are input electrodes, the second electrode 646 and the fourth electrode 666 are output electrodes. When a single key is pressed, the location of the key can be detected via measuring a voltage change of the second electrode 646 and the fourth electrode 666.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A keyboard comprising:
a first substrate comprising a first upper surface and a first lower surface;
a second substrate located apart from the first substrate and comprising a second upper surface and a second lower surface opposite the second upper surface, and the second upper surface facing the first lower surface;
a first electrode layer positioned on the first lower surface and comprising a first conductive layer comprising a carbon nanotube layer structure, a first resistivity of the carbon nanotube layer structure along a first direction is larger than a second resistivity of the carbon nanotube layer structure along a second direction that is substantially perpendicular with the first direction;
a first electrode positioned on one end of the carbon nanotube layer structure and oriented along the first direction;
a plurality of detecting electrodes positioned on another end of the carbon nanotube layer structure and arranged along the first direction;
a second electrode layer positioned on the second upper surface and comprising a second conductive layer; and
a plurality of rows of keys positioned on the first upper surface, each of the plurality of rows is aligned along the second direction, and an amount of the plurality of detecting electrodes is larger than an amount of the plurality of rows,
wherein each key is detectable by at least one detecting electrode.

2. The keyboard of claim 1, wherein the carbon nanotube layer structure comprises a plurality of carbon nanotubes oriented along the second direction.

3. The keyboard of claim 2, wherein the plurality of carbon nanotubes are joined end to end with each other by van der Waals attractive force in the second direction.

4. The keyboard of claim 1, wherein the second electrode layer further comprises a second electrode positioned on a surface of the second conductive layer and symmetrically aligned with four sides of the second conductive layer.

5. The keyboard of claim 1, wherein materials of the first substrate and the second substrate are flexible.

6. The keyboard of claim 5, wherein the material of the second substrate is fabric.

7. The keyboard of claim 1, wherein the carbon nanotube layer structure is a pure structure of carbon nanotubes.

8. The keyboard of claim 1, wherein the second conductive layer comprises a second carbon nanotube layer structure comprising a plurality of carbon nanotubes dispersed uniformly.

9. The keyboard of claim 1, wherein the first conductive layer comprises a plurality of carbon nanotubes oriented along the second direction, and the second conductive layer comprises a plurality of carbon nanotubes oriented along the first direction perpendicular with the second direction.

10. The keyboard of claim 9, wherein the second electrode layer comprises a second electrode and a plurality of second detecting electrodes, the second electrode is positioned on an end of the second conductive layer, the plurality of second detecting electrodes are positioned on another opposite end of the second conductive layer, the second electrode is oriented along the second direction, and the plurality of detecting electrodes is arranged along the second direction.

11. The keyboard of claim 9, wherein the second electrode layer comprises a plurality of third detecting electrodes and a plurality of fourth detecting electrodes located at two opposite ends of the second conductive layer, and the plurality of third detecting electrodes and the plurality of fourth detecting electrodes are arranged along the second direction.

* * * * *